(No Model.)
H. W. LAFFERTY.
APPARATUS FOR UTILIZING REFUSE OF BREWERIES.
No. 345,704. Patented July 20, 1886.
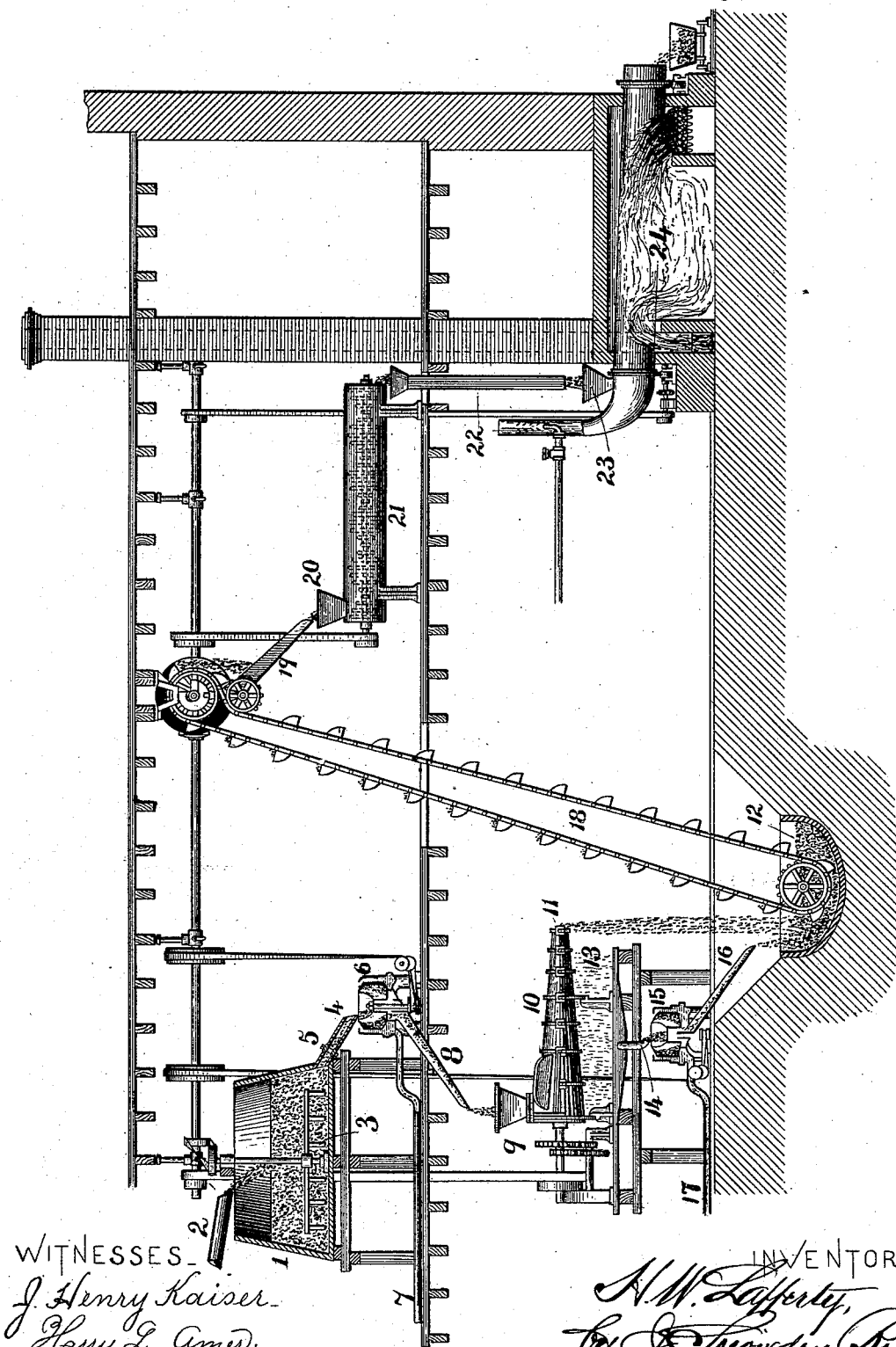
WITNESSES
J. Henry Kaiser
Harry L. Ames
INVENTOR
H. W. Lafferty,
by J. Snowden Bell
Atty.

UNITED STATES PATENT OFFICE.

HUGH W. LAFFERTY, OF GLOUCESTER, NEW JERSEY.

APPARATUS FOR UTILIZING REFUSE OF BREWERIES.

SPECIFICATION forming part of Letters Patent No. 345,704, dated July 20, 1886.

Application filed February 3, 1886. Serial No. 190,747. (No model.)

*To all whom it may concern:*

Be it known that I, HUGH W. LAFFERTY, of Gloucester, in the county of Camden and State of New Jersey, have invented certain new and useful Improvements in Apparatus for Utilizing the Refuse or Slops of Breweries, Distilleries, Starch-Factories, &c., of which improvements the following is a specification.

In an application for Letters Patent filed by me under date of December 17, 1885, Serial No. 185,881, I have set forth and claimed a process or method of treating the semi-liquid residuum consisting of a mixture of water with hulls of grain, meal, gluten, gum, cellulose, and other ingredients, which is produced in large quantities where grain of different descriptions is subjected to the action of water and heat for the purpose of extracting certain of its constituents—as, for example, in brewing, distilling, and the manufacture of starch.

My present invention relates to means for effectively carrying out the process above referred to; and my improvements consist in an apparatus or plant, as hereinafter described, and as described and shown, but not claimed, in my application, Serial No. 185,881, aforesaid, for the practice of said process.

The improvements claimed are hereinafter fully set forth.
Referring to the accompanying drawing, which illustrates an apparatus or plant embodying my invention, the semi-liquid residuum to be treated is delivered as produced through a spout or channel, 2, into a receiving-tank, 1, which should be provided with a suitable stirrer or agitator, 3, by the rotation of which the liquid and solid constituents of the residuum are kept thoroughly mixed together to prevent the settling of the solid matters. The residuum is drawn off from the tank 1 through a discharge-spout, 4, governed by a cock or valve, 5, into a centrifugal separating-machine, 6, adapted to separate the solid and liquid constituents by the difference of their specific gravities under the influence of centrifugal force.

The construction of the centrifugal separating-machine not constituting part of my present invention, and various types thereof being known in the art, the same need not be herein set forth, further than to specify that it should be provided with a solid or imperforate drum or basket, so as to obviate any loss of solid matter in the separation of the water. Rotation being imparted to the drum or basket of the centrifugal separator 6, and the residuum fed continuously thereto, the solid constituents are driven by the action of centrifugal force against the inner surface of the drum, and there accumulate, while the major portion of the water is discharged through one or more passages at the top of the drum into the casing of the machine, and escapes, free from solid constituents, through a pipe, 7, by which it is led to any desired point of discharge. The moist and pasty aggregation of solid matter which accumulates on the wall of the drum or basket of the centrifugal separator 6, and which will be found to be in volume about one-fifth of the charge supplied thereto, is cleared off from time to time as the drum becomes filled, and discharged from the drum through a chute, 8, from which it is fed, either directly or in separate successive charges, as may be found most convenient, into the receiving-hopper of a continuous press, 10, by which a further separation of the solid and liquid constituents of the residuum as received from the separator 6 is effected, a very large proportion, or nearly all, of the solid material being discharged in a comparatively-dry condition from the delivery-opening 11 of the press into a suitable bin or receptacle, 12, while the water, with such small proportion of gluten and other solid constituents as it may carry off, is squeezed out by the press into a pan or trough, 13.

To effect the retention and saving of any solid constituents of the watery discharge from the press 10, the same is fed from the pan 13 through a pipe, 14, into a secondary or supplemental centrifugal separating-machine, 15, of similar construction to that first specified. The remaining portion of the contained solid matter is collected in the drum of the machine 15, and is discharged therefrom from time to time through a chute into the bin 12, which receives the solid discharge of the press, while the clear water is discharged into the casing of the machine and runs off through a waste-pipe. The comparatively-dry material supplied, as above stated, from the press and secondary centrifugal separator to the bin 12, is carried therefrom in any convenient manner, as by a conveyer, 18, to a feed-spout, 19, from which it is delivered to the hopper 20 of a mixer, 21, in which its particles are thoroughly mixed together, and is finally fed through a chute or conduit, 22, into the receiving-hopper 23 of a drier, 24, of any approved construction. Inasmuch as nearly all the moisture has been removed from the material in the preceding operations, the application of a comparatively-low degree of heat for a brief period suffices to complete is a thorough manner the drying operation, and the resultant product as removed from the drier will be in proper condition to be packed for storage or transportation in readiness for use.

I do not desire to limit myself to the use of apparatus specifically similar to that herein set forth, as the same may be varied in many particulars without departing from the spirit of my invention, so long as a series of mechanisms possessing similar capacities in operation is employed to coact as an organized plant in the performance of a process, as hereinbefore described.

I claim as my invention, and desire to secure by Letters Patent—

1. In a plant or apparatus for the utilization of refuse or slops of breweries, distilleries, &c., the combination of a centrifugal separating-machine, a straining or expressing press, and a drier, substantially as set forth.

2. In a plant or apparatus for the utilization of refuse or slops of breweries, distilleries, &c., the combination of a centrifugal separating-machine, a straining or expressing press, a secondary centrifugal separating-machine, and a drier, substantially as set forth.

3. In a plant or apparatus for the utilization of refuse or slops from breweries, distilleries, &c., the combination of a receiving tank or vessel, a discharge spout or channel leading therefrom, a centrifugal separating-machine adapted to receive the material delivered from said spout or channel, a chute or passage serving to convey the partially-solid residue delivered from said machine to the feed-hopper of a straining or expressing press, a pipe serving to carry off the watery discharge from said press, a secondary centrifugal machine receiving said discharge, a mixer receiving the partially-solid residues of the press and the secondary centrifugal separating-machine, and a drier adapted to receive the material discharged from said mixer, substantially as set forth.

HUGH W. LAFFERTY.

Witnesses:
 EDMUND W. LAFFERTY,
 JAMES M. CASSADY.